United States Patent
Hagari

(10) Patent No.: US 7,788,022 B2
(45) Date of Patent: Aug. 31, 2010

(54) CONTROL APPARATUS FOR INTERNAL COMBUSTION ENGINE

(75) Inventor: Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 218 days.

(21) Appl. No.: 12/189,466

(22) Filed: Aug. 11, 2008

(65) Prior Publication Data

US 2009/0277247 A1 Nov. 12, 2009

(30) Foreign Application Priority Data

May 12, 2008 (JP) ............................. 2008-124762

(51) Int. Cl.
*F02P 5/15* (2006.01)
*G01L 23/22* (2006.01)

(52) U.S. Cl. .................. 701/111; 123/406.38; 73/35.04

(58) Field of Classification Search ................ 123/435, 123/406.16, 406.17, 406.21, 406.22, 406.29, 123/406.34, 406.37, 406.38, 406.41, 406.43; 701/111; 73/35.04, 35.07, 35.12

See application file for complete search history.

(56) References Cited

U.S. PATENT DOCUMENTS 6,529,817 B2 * 3/2003 Torno et al. ................. 701/111
6,975,969 B2 * 12/2005 Sauler et al. ................. 702/189

FOREIGN PATENT DOCUMENTS

| JP | 11-303673 A | 11/1999 |
|---|---|---|
| JP | 3093467 B2 | 7/2000 |
| JP | 3098104 B2 | 8/2000 |
| JP | 2002-357156 A | 12/2002 |
| JP | 2004-340107 A | 12/2004 |
| JP | 2004-353531 A | 12/2004 |
| JP | 2009-275521 | * 11/2009 |

* cited by examiner

*Primary Examiner*—Hai H Huynh
(74) *Attorney, Agent, or Firm*—Sughrue Mion, PLLC

(57) ABSTRACT

Provided is a control apparatus for an internal combustion engine with which temporal and frequency resolutions necessary for analysis of a frequency of knock by digital signal processing are ensured with limited amounts of processing and memory. The control apparatus includes a lowpass filter for eliminating a high frequency component of an output signal from a knock sensor or a cylinder internal pressure sensor, an A/D conversion unit for performing A/D conversion on the output signal from the filter, and DFT processing units for performing digital signal processing on data obtained by the A/D conversion as knock detection units, each of the DFT processing units includes observation interval setting units for dividing the A/D-converted data to set observation intervals each containing a predetermined number of samples, and a multi-frequency simultaneous analysis unit for simultaneously analyzing multiple frequencies by a discrete Fourier transform for each of the set observation intervals.

5 Claims, 10 Drawing Sheets

FIG. 5

FREQUENCY RESOLUTION: HIGH
TEMPORAL RESOLUTION: LOW

RELATION OF N-k-fk

| k \ N | 16 | 20 | 24 | 28 | 32 | 36 |
|---|---|---|---|---|---|---|
| 0 | 0.00 | 0.00 | 0.00 | 0.00 | 0.00 | 0.00 |
| 1 | 3.13 | 2.50 | 2.08 | 1.79 | 1.56 | 1.39 |
| 2 | 6.25 | 5.00 | 4.17 | 3.57 | 3.13 | 2.78 |
| 3 | 9.38 | 7.50 | 6.25 | 5.36 | 4.69 | 4.17 |
| 4 | 12.50 | 10.00 | 8.33 | 7.14 | 6.25 | 5.56 |
| 5 | 15.63 | 12.50 | 10.42 | 8.93 | 7.81 | 6.94 |
| 6 | 18.75 | 15.00 | 12.50 | 10.71 | 9.38 | 8.33 |
| 7 | 21.88 | 17.50 | 14.58 | 12.50 | 10.94 | 9.72 |
| 8 | 25.00 | 20.00 | 16.67 | 14.29 | 12.50 | 11.11 |
| 9 | | 22.50 | 18.75 | 16.07 | 14.06 | 12.50 |
| 10 | | 25.00 | 20.83 | 17.86 | 15.63 | 13.89 |
| 11 | | | 22.92 | 19.64 | 17.19 | 15.28 |
| 12 | | | 25.00 | 21.43 | 18.75 | 16.67 |
| 13 | | | | 23.21 | 20.31 | 18.06 |
| 14 | | | | 25.00 | 21.88 | 19.44 |
| 15 | | | | | 23.44 | 20.83 |
| 16 | | | | | 25.00 | 22.22 |
| 17 | | | | | | 23.61 |
| 18 | | | | | | 25.00 |
| 19 | | | | | | |
| 20 | | | | | | |

ALIASING AREA

FREQUENCY RESOLUTION: LOW
TEMPORAL RESOLUTION: HIGH

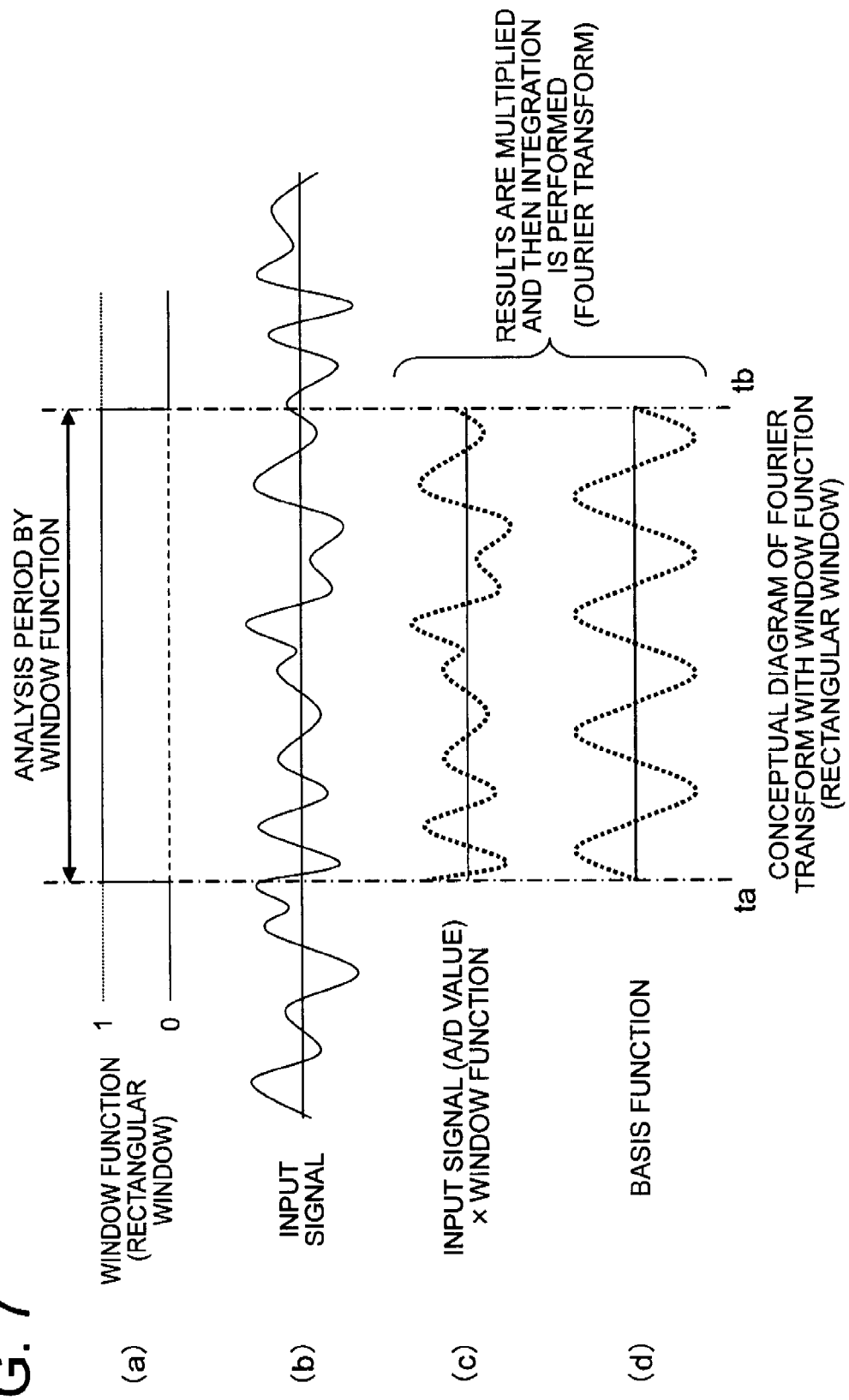

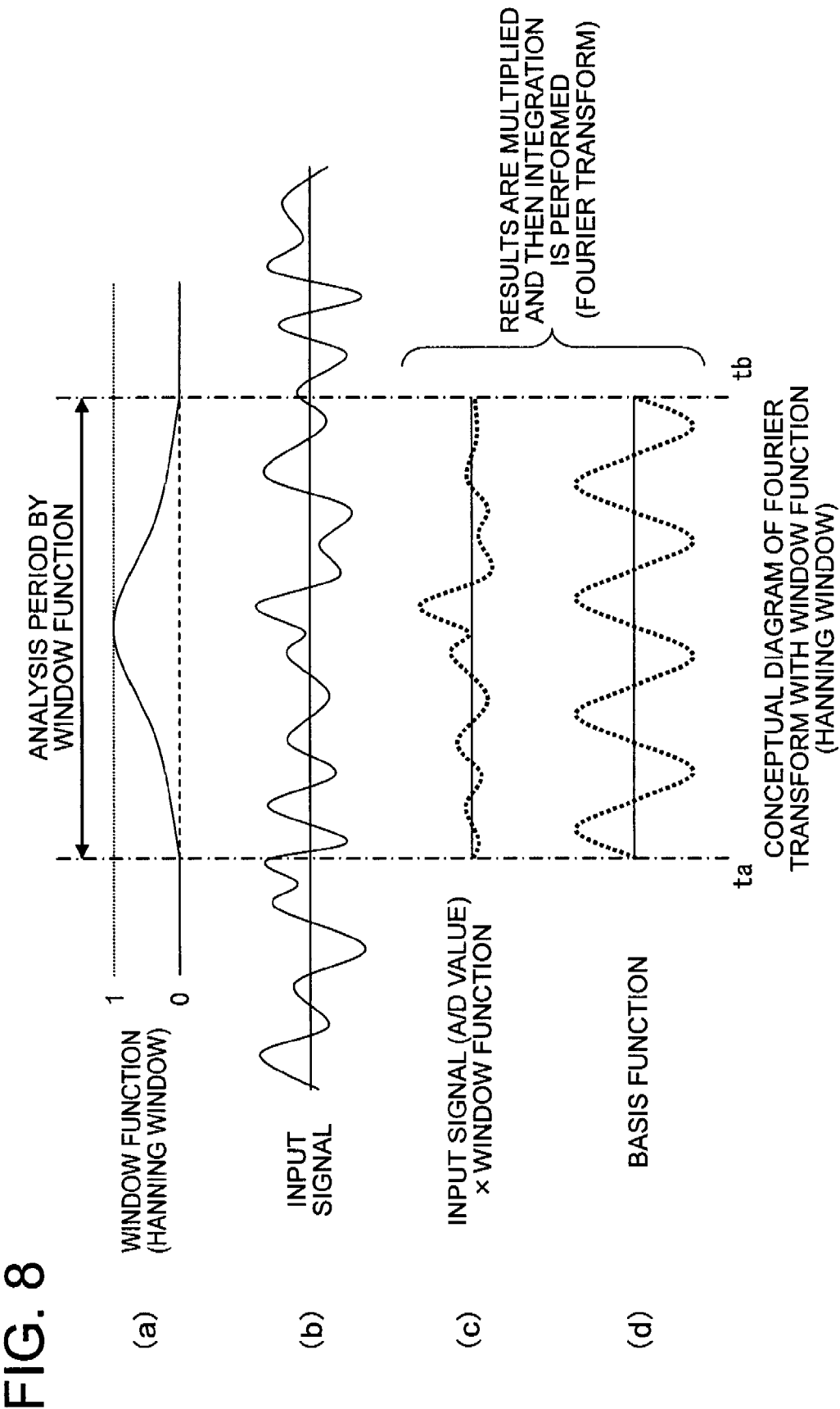

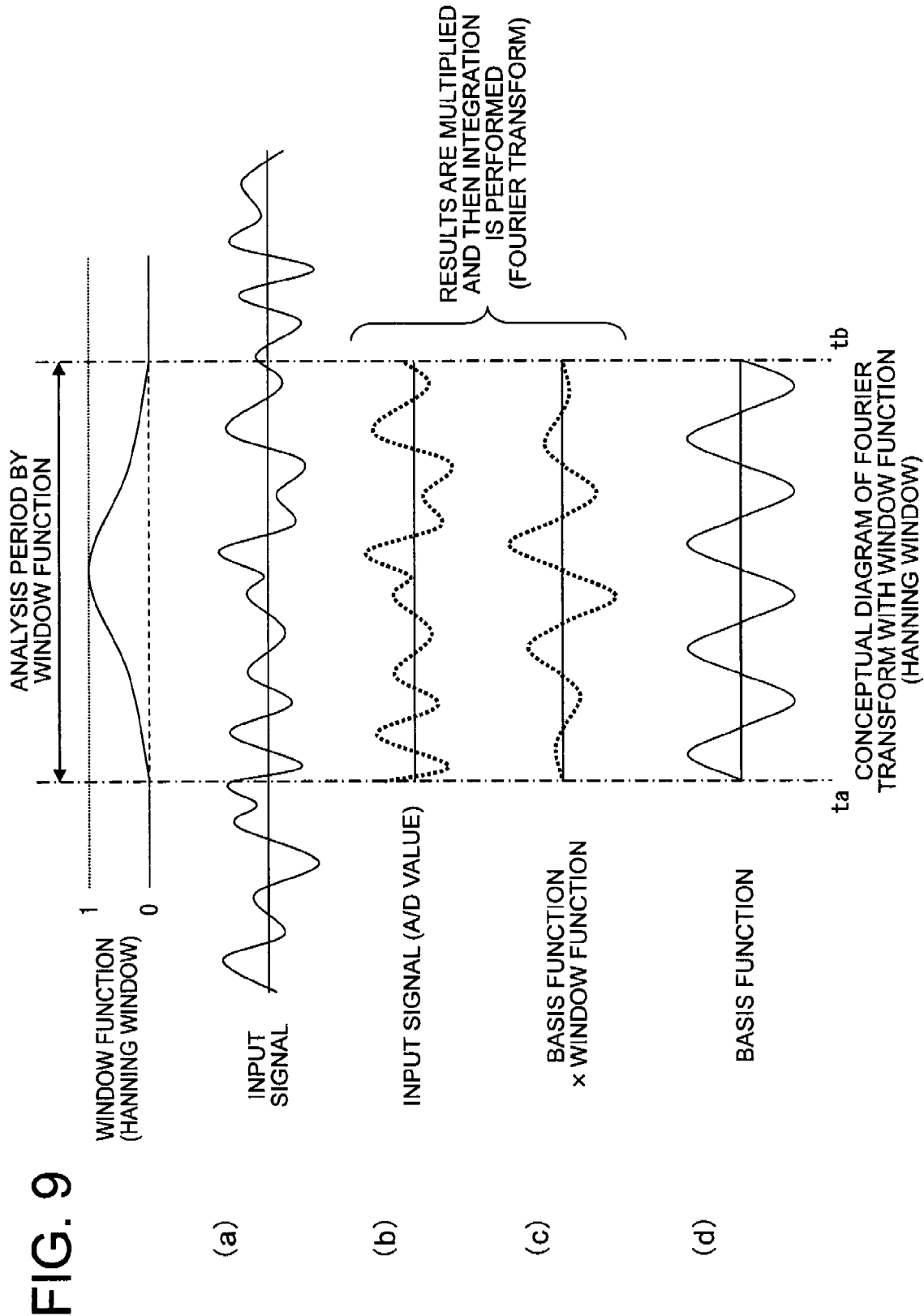

FIG. 10A

DFT COMPUTATION CONSTANT Kws(n)

$$K_{wc}(n) = w(n) \cdot \cos\left(\frac{2\pi}{N} kn\right)$$

| fk[kHz] | k\n | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0.00 | 0 | 0.0000 | 0.0432 | 0.1654 | 0.3455 | 0.5523 | 0.7500 | 0.9045 | 0.9891 | 0.9891 | 0.9045 | 0.7500 | 0.5523 | 0.3455 | 0.1654 | 0.0432 | 0.0000 |
| 3.13 | 1 | 0.0000 | 0.0399 | 0.1170 | 0.1322 | 0.0000 | -0.2870 | -0.6396 | -0.9138 | -0.9891 | -0.8357 | -0.5303 | -0.2113 | 0.0000 | 0.0633 | 0.0306 | 0.0000 |
| 6.25 | 2 | 0.0000 | 0.0306 | 0.0000 | -0.2443 | -0.5523 | -0.5303 | 0.0000 | 0.6994 | 0.9891 | 0.6396 | 0.0000 | -0.3905 | -0.3455 | -0.1170 | 0.0000 | 0.0000 |
| 9.38 | 3 | 0.0000 | 0.0165 | -0.1170 | -0.3192 | 0.0000 | 0.6929 | 0.6396 | -0.3785 | -0.9891 | -0.3461 | 0.5303 | 0.5102 | 0.0000 | -0.1528 | -0.0306 | 0.0000 |
| 12.50 | 4 | 0.0000 | 0.0000 | -0.1654 | 0.0000 | 0.5523 | -0.6929 | -0.9045 | 0.0000 | 0.9891 | 0.0000 | -0.7500 | 0.0000 | 0.3455 | 0.0000 | -0.0432 | 0.0000 |
| 15.63 | 5 | 0.0000 | -0.0165 | -0.1170 | 0.3192 | 0.5523 | -0.6929 | -0.6396 | 0.3785 | 0.9891 | 0.3461 | -0.7500 | -0.5102 | -0.3455 | 0.1528 | 0.0306 | 0.0000 |
| 18.75 | 6 | 0.0000 | -0.0306 | 0.0000 | 0.2443 | -0.5523 | 0.5303 | 0.0000 | -0.6994 | 0.9891 | -0.6396 | 0.0000 | 0.3905 | -0.3455 | 0.1170 | 0.0000 | 0.0000 |
| 21.88 | 7 | 0.0000 | -0.0399 | 0.1170 | -0.1322 | 0.0000 | 0.2870 | -0.6396 | 0.9138 | -0.9891 | 0.8357 | -0.5303 | 0.2113 | 0.0000 | -0.0633 | 0.0306 | 0.0000 |
| 25.00 | 8 | 0.0000 | -0.0432 | 0.1654 | -0.3455 | 0.5523 | -0.7500 | 0.9045 | -0.9891 | 0.9891 | -0.9045 | 0.7500 | -0.5523 | 0.3455 | -0.1654 | 0.0432 | 0.0000 |

FIG. 10B

DFT COMPUTATION CONSTANT Kws(n)

$$K_{ws}(n) = w(n) \cdot \sin\left(\frac{2\pi}{N} kn\right)$$

| fk[kHz] | k\n | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0.00 | 0 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 3.13 | 1 | 0.0000 | 0.0165 | 0.1170 | 0.3192 | 0.5523 | 0.6929 | 0.6396 | 0.3785 | 0.0000 | -0.3461 | -0.5303 | -0.5102 | -0.3455 | -0.1528 | -0.0306 | 0.0000 |
| 6.25 | 2 | 0.0000 | 0.0306 | 0.1654 | 0.3192 | 0.3455 | 0.0000 | -0.5303 | -0.6396 | -0.9045 | -0.6396 | -0.3785 | 0.3905 | 0.3455 | 0.0633 | -0.0432 | 0.0000 |
| 9.38 | 3 | 0.0000 | 0.0399 | 0.1654 | 0.2443 | 0.0000 | -0.2870 | -0.5303 | -0.9891 | 0.0000 | 0.9045 | 0.7500 | 0.2113 | 0.0000 | 0.1654 | -0.0306 | 0.0000 |
| 12.50 | 4 | 0.0000 | 0.0432 | 0.0000 | -0.1322 | -0.5523 | -0.7500 | 0.0000 | 0.9138 | 0.9891 | 0.8357 | 0.0000 | -0.5523 | -0.3455 | 0.0633 | 0.0432 | 0.0000 |
| 15.63 | 5 | 0.0000 | 0.0399 | -0.1170 | -0.1322 | 0.0000 | 0.2870 | 0.9045 | 0.6994 | 0.0000 | -0.6396 | 0.5303 | 0.2113 | 0.3455 | -0.1170 | 0.0306 | 0.0000 |
| 18.75 | 6 | 0.0000 | 0.0306 | -0.1654 | 0.2443 | 0.5523 | -0.5303 | -0.6396 | 0.3785 | 0.0000 | -0.3461 | 0.5303 | -0.5102 | 0.0000 | -0.1528 | 0.0306 | 0.0000 |
| 21.88 | 7 | 0.0000 | 0.0165 | -0.1170 | 0.3192 | -0.5523 | 0.6929 | -0.6396 | -0.3785 | 0.0000 | 0.3461 | -0.5303 | 0.5102 | 0.3455 | 0.1654 | -0.0306 | 0.0000 |
| 25.00 | 8 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |

CONTROL APPARATUS FOR INTERNAL COMBUSTION ENGINE

BACKGROUND OF THE INVENTION

1. Field of the Invention

The present invention relates to a control apparatus for an internal combustion engine, in particular, a control apparatus for an internal combustion engine, which performs knock control to prevent knock by retarding ignition timing in the detection of the knock occurring in the internal combustion engine.

2. Description of the Related Art

A method of detecting a knock phenomenon induced in an internal combustion engine (hereinafter, referred to simply as engine) with a vibration sensor is conventionally known. According to the method, it is known that a vibration in a specific frequency band is generated according to a vibration mode of the engine or knock when the knock occurs during the operation of the engine. A vibration intensity at the specific frequency is measured to detect the knock. Specifically, the following methods have been proposed. One method uses an analog band-pass filter circuit to extract the specific frequency and then measures the vibration intensity based on a peak-hold value passing through the band-pass filter, which is obtained by inputting an output from the analog band-pass filter circuit to a peak-hold circuit (for example, see Japanese Patent Application Laid-open No. 2002-357156; hereinafter, referred to as Patent Document 1). Another method performs digital signal processing (for example, Fast Fourier Transform (FFT)) using a digital signal processor (DSP) to measure a vibration intensity based on a spectrum value at the specific frequency (for example, see Japanese Patent Nos. 3093467 and 3098104; hereinafter, respectively referred to as Patent Documents 2 and 3).

When the analog band-pass filter circuit is configured as in Patent Document 1 described above, the degree of freedom in control is low for a large number of components. For example, when a plurality of frequency bands is desired to be simultaneously analyzed, the number of components is disadvantageously further increased. Moreover, when the DSP is used as in Patent Documents 2 and 3 described above, the DSP itself is expensive. Further, when the DSP is a specially designed one, the degree of freedom in control is disadvantageously limited.

With the enhanced functionality and the lowered cost of microcomputers in recent years, the problems described above are expected to be improved by using a microcomputer for vehicle engine control, which has processing capability at the level of executing digital signal processing by itself without using the DSP as described above. Specifically, it is believed that the frequency analysis with the digital signal processing using the microcomputer greatly reduces the size of an I/F circuit as compared with the conventional methods using the analog circuit and greatly improves the degree of freedom in control as compared with the conventional methods with the digital processing using the dedicated DSP.

On the other hand, the digital signal processing using the microcomputer has a specific problem. Specifically, since the microcomputer performs all the processing for vehicle engine control, it is necessary to ensure temporal and frequency resolutions, which are required for the frequency analysis of knock, although the amount of processing and the amount of memory which can be used for the frequency analysis of the knock are limited. For example, when the methods described in Patent Documents 2 and 3 are applied to the digital signal processing using the microcomputer, there arise the following problems because the methods use the FFT.

Specifically:

A large amount of computation and a large amount of required memory for analyzing all the frequency bands;

A small number of choices for the frequency to be analyzed because the number of samples contained in an observation interval is limited to a power of two; and A variation is generated in temporal resolution with respect to a frequency resolution because the number of samples in the observation interval is fixed (the vibration intensity changes more rapidly as the frequency becomes higher; in an analysis interval which is set longer to capture a slow change at a low frequency, however, a rapid change at the high frequency cannot be captured in some cases although the slow change can be captured).

SUMMARY OF THE INVENTION

The present invention has been made to solve the problems as described above, and has an object to provide a control apparatus for an internal combustion engine, which is capable of ensuring a temporal resolution and a frequency resolution necessary and sufficient for the frequency analysis of knock with small amounts of computation and memory, and further, of even increasing the number of options for a frequency to be analyzed.

A control apparatus for an internal combustion engine according to the present invention includes: knock detection means for determining occurrence of knock based on an output signal from at least one of a knock sensor and a cylinder internal pressure sensor provided for the internal combustion engine; and knock control means for performing knock control to avoid the knock in detection of the knock by the knock detection means. The knock detection means includes: a lowpass filter for eliminating a high frequency component of the output signal from the at least one of the knock sensor and the cylinder internal pressure sensor; A/D conversion means for performing A/D conversion on the output signal from the lowpass filter for each predetermined time; and digital signal processing means for performing digital signal processing on the data obtained by the A/D conversion performed by the A/D conversion means to perform a time-frequency analysis, the knock detection means performing knock detection based on a result of the digital signal processing by the digital signal processing means. The digital signal processing means includes: observation interval setting means for dividing the data obtained by the A/D conversion performed by the A/D conversion means to set observation intervals each containing a predetermined number of samples; and multi-frequency simultaneous analysis means for simultaneously analyzing multiple frequencies by a discrete Fourier transform for each of the observation intervals set by the observation interval setting means. The observation interval setting means changes the number of samples contained in each of the observation intervals according to a frequency to be analyzed.

According to the present invention, the digital signal processing means performs the functions of the observation interval setting means for dividing the data obtained by the A/D conversion performed by the A/D conversion means to set observation intervals each containing a predetermined number of samples, and the multi-frequency simultaneous analysis means for simultaneously analyzing the multiple frequencies by the discrete Fourier transform for each of the set observation intervals. Moreover, the number of samples contained in the observation interval is changed according to the frequency to be analyzed. Therefore, the present invention provides an excellent effect of ensuring necessary and sufficient temporal and frequency resolutions for the analysis of the frequency of knock with small amounts of computation and memory to detect the knock with good accuracy.

BRIEF DESCRIPTION OF THE DRAWINGS

In the accompanying drawings:

FIG. 5 is a view illustrating the contents of processing in the DFT processing units illustrated in FIG. 3, which illustrates a method of selecting the number of samples N in each of observation intervals a and b;

FIG. 7 is a conceptual diagram of a Fourier transform with a window function (rectangular window), for illustrating the contents of processing in the DFT processing units illustrated in FIG. 3;

FIG. 8 is a conceptual diagram of the Fourier Transform with a window function (Hanning window), for illustrating the contents of processing in the DFT processing units illustrated in FIG. 3;

FIG. 9 is a conceptual diagram of the Fourier Transform with a window function (Hanning window), for illustrating the contents of processing in the DFT processing units illustrated in FIG. 3; and FIGS. 10A and 10B are views illustrating tables of constants for discrete Fourier transform computation, for illustrating the contents of processing in the DFT processing units illustrated in FIG. 3.

DESCRIPTION OF THE EMBODIMENTS

Figure 1:
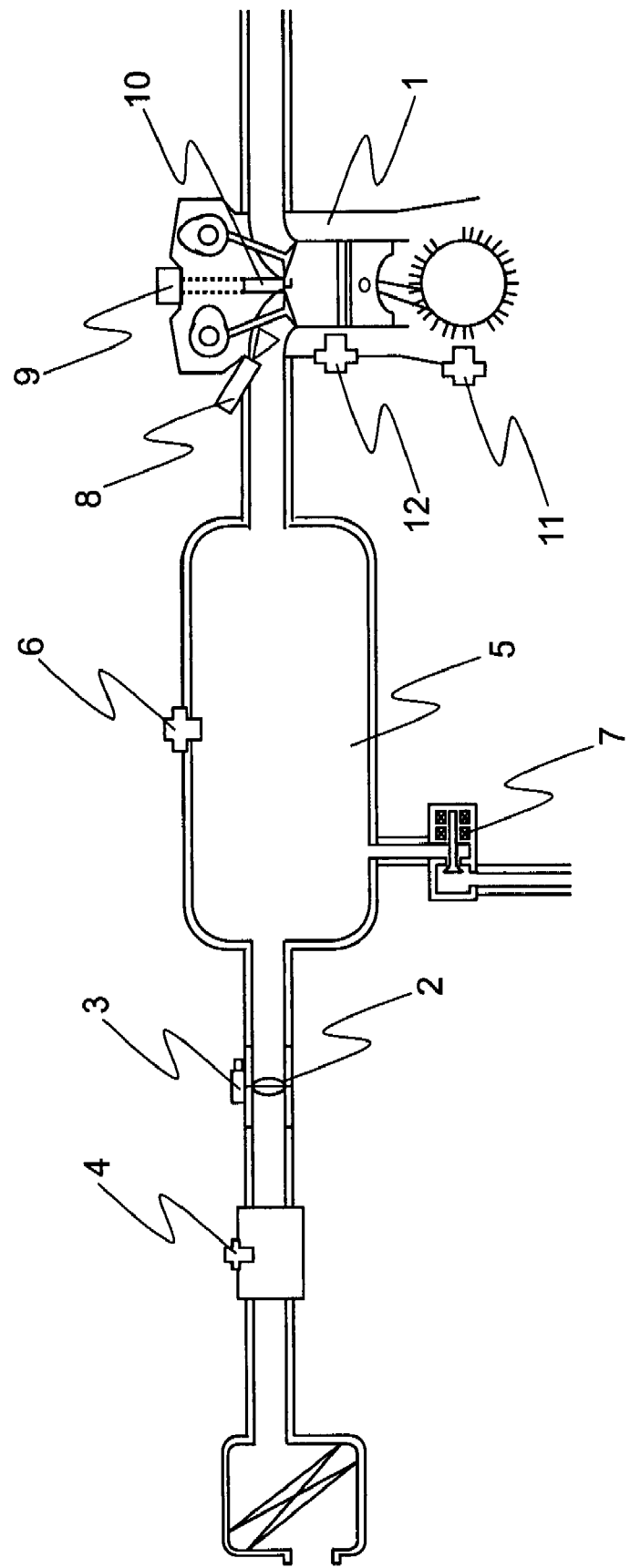
FIG. 1 is a configuration diagram schematically illustrating engine peripheral equipment, for illustrating a control apparatus for an internal combustion engine according to an embodiment of the present invention.
Figure 2:
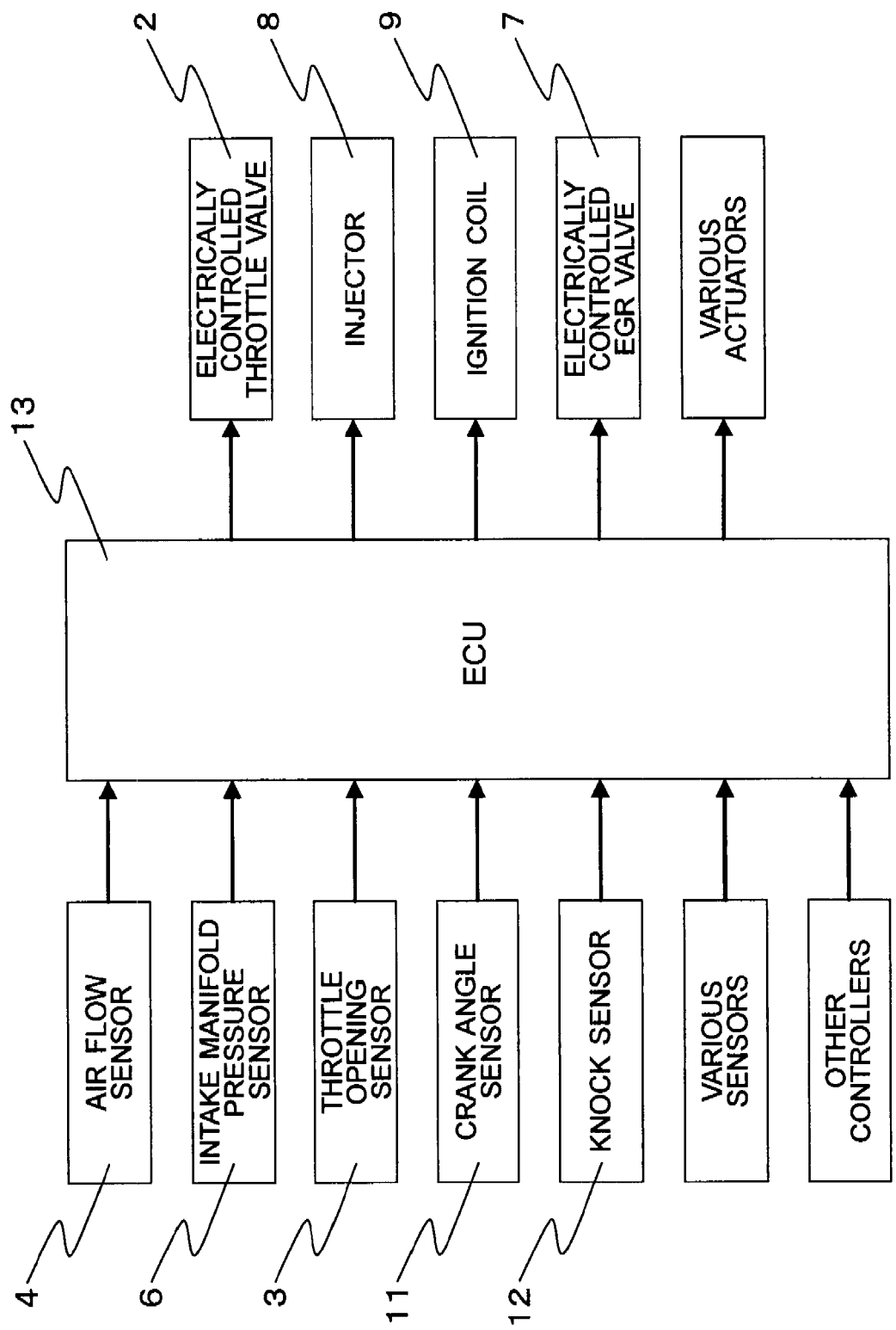
FIG. 2 is a block diagram illustrating a configuration of the control apparatus for the internal combustion engine according to the embodiment of the present invention.

Hereinafter, an embodiment of the present invention is described in detail referring to the accompanying drawings. FIGS. 1 and 2 are views, respectively schematically illustrating a configuration of engine peripheral equipment and a configuration of a control apparatus for an internal combustion engine, for illustrating the control apparatus of the internal combustion engine according to the embodiment of the present invention.

As illustrated in FIG. 1, provided upstream of an intake system of an internal combustion engine (hereinafter, referred to simply as engine) 1 is an electronically controlled throttle valve 2 which is electronically controlled to adjust the amount of intake air flow. A throttle opening sensor 3 is also provided to measure an opening of the electronically controlled throttle valve 2. Further, provided upstream of the electronic control throttle valve 2 is an air flow sensor 4 for measuring the amount of intake air flow. Provided downstream of the electronically controlled throttle valve 2 on the side of the engine 1 is an intake manifold pressure sensor 6 for measuring a pressure in a surge tank 5. Both of or any one of the air flow sensor 4 and the intake manifold pressure sensor 6 may be provided.

Further, an electrically controlled exhaust gas recirculation (EGR) valve 7 is connected to the surge tank 5. In an inlet passage downstream of the surge tank 5, an injector 8 for injecting a fuel is provided. The injector 8 may be provided to be able to directly inject the fuel into a cylinder of the engine 1. Further, an ignition coil 9, an ignition plug 10, a crank angle sensor 11, and a knock sensor 12 are provided in the engine 1. The ignition coil 9 and the ignition plug 10 are provided to ignite a mixture in the cylinder of the engine 1. The crank angle sensor 11 detects an edge of a plate provided for a crank shaft to detect a rotation speed or a crank angle of the engine. The knock sensor 12 detects the vibration of the engine. Instead of the knock sensor 12, a cylinder internal pressure sensor (not shown) for detecting a pressure in the cylinder of the engine may be provided for each cylinder.

As illustrated in FIG. 2, the intake air flow amount measured by the air flow sensor 4, the intake manifold pressure measured by the intake manifold pressure sensor 6, the opening of the electrically controlled throttle valve 2, which is measured by the throttle opening sensor 3, a pulse in synchronization with the edge of the plate provided for the crank shaft, which is output from the crank angle sensor 11, and a vibration waveform of the engine, which is measured by the knock sensor 12, are input to an engine control unit (hereinafter, referred to as ECU) 13. From various sensors other than those described above, measured values are also input to the ECU 13. Further, signals from the other controllers (for example, control systems for automatic transmission control, brake control, and traction control) are also input to the ECU 13.

The ECU 13 calculates a target throttle opening based on an accelerator opening, an operating state of the engine and the like to control the electronically controlled throttle valve 2. The ECU 13 controls the opening of the electronically controlled EGR valve 7 according to the operating state at that time, controls the driving of the injector 8 to achieve a target air/fuel ratio, and controls the energization of the ignition coil 9 to achieve target ignition timing. The ECU 13 performs a function of knock detection means for determining the occurrence of knock based on an output signal from the knock sensor 12 or the cylinder internal pressure sensor (not shown) provided for the engine 1 and a function of knock control means for knock control to prevent the knock in the detection of the knock. When the knock is detected by the method described below, the target ignition timing is set to be retarded to perform control for suppressing the occurrence of the knock. Further, the ECU 13 also calculates instruction values to various actuators other than those described above.

Figure 3:
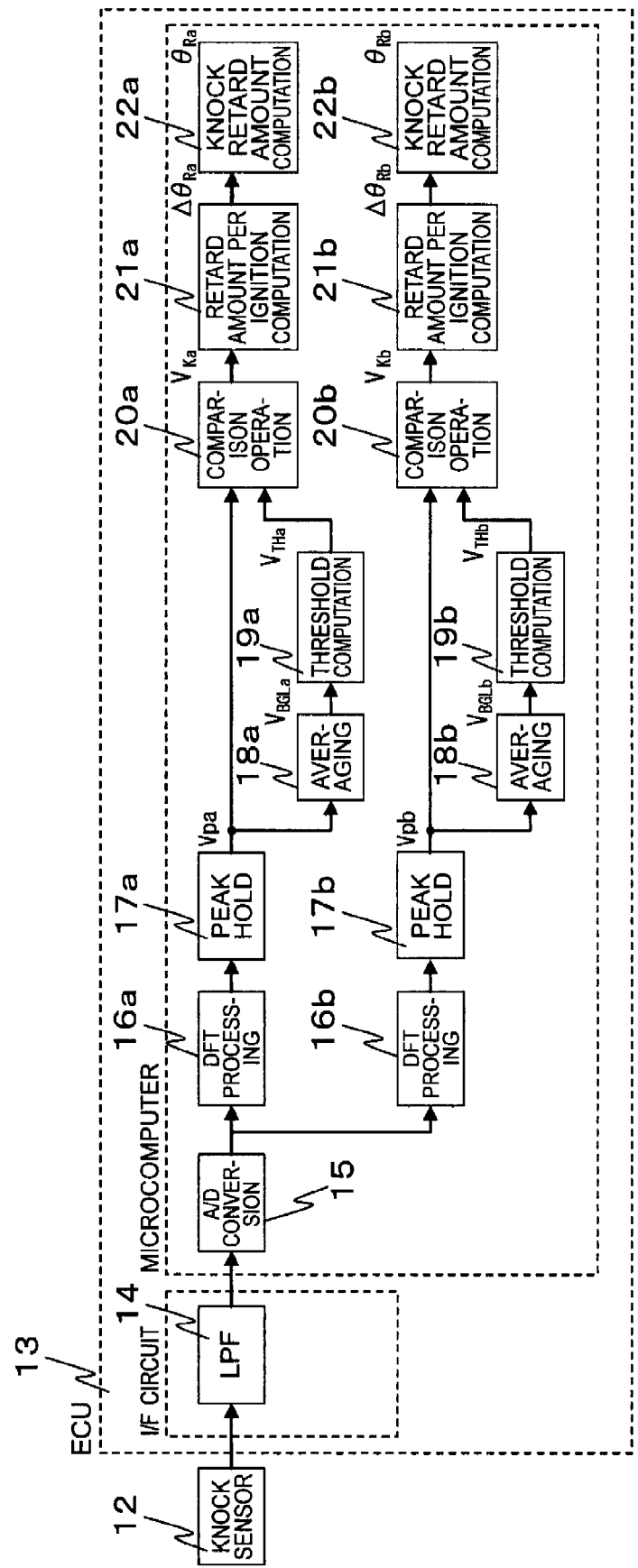
FIG. 3 is a block diagram illustrating a configuration of the entire knock detection and knock control by an ECU illustrated in FIG. 2.

Next, referring to FIG. 3, the schema of the knock detection and the knock control performed in the ECU 13 is described. FIG. 3 is a block diagram illustrating a configuration of the entire knock detection and knock control performed by the ECU 13. FIG. 3 illustrates the knock sensor 12 and the ECU 13 illustrated in FIGS. 1 and 2, respectively. The configuration of a knock detection/knock control portion is described. The ECU 13 includes various I/F circuits and a microcomputer. The microcomputer includes an A/D converter for converting an analog signal into a digital signal, a ROM area for storing a control program and a control constant, and a RAM area for storing a variable when the program is executed.

The I/F circuit includes a lowpass filter (LPF) 14 for removing a high frequency component of a signal output from the knock sensor 12. The microcomputer includes an A/D converting unit 15 and DFT processing units 16a and 16b. The A/D converting unit 15 converts an analog signal input through the LPF 14 into a digital signal at constant time intervals (for example, every 10 µs, 20 µs or the like). Each of the DFT processing units 16a and 16b serves as digital signal processing means for performing a time-frequency analysis using discrete Fourier transform (DFT) processing on the digital signal output from the A/D converting unit 15 to calculate a spectrum of a different knock-specific frequency component. The A/D conversion by the A/D converting unit 15 may be constantly performed or may be performed only in a period in which the knock occurs (for example, from TDC to 50° CA ATDC and the like; hereinafter, the period is referred to as a knock detection window).

The DFT processing units 16a and 16b, each serving as the digital signal processing means, constitute the knock detection means together with the lowpass filter 14 and the A/D converting unit 15. Each of the DFT processing units 16a and 16b has the functions of observation interval setting means (not shown) and multi-frequency simultaneous analysis means (not shown). The observation interval setting means divides the data obtained by the A/D conversion performed by the A/D converting unit 15 to set observation intervals each containing a predetermined number of samples. The multi-frequency simultaneous analysis means simultaneously analyzes multiple frequencies by the DFT for each of the observation intervals set by the observation interval setting means. By the observation interval setting means, the number of samples contained in each of the observation intervals can be changed according to the frequency to be analyzed. The details of a DFT processing method by the DFT processing units 16a and 16b are described below.

The microcomputer also includes peak hold units 17a and 17b, averaging units 18a and 18b, and threshold computation units 19a and 19b. The peak hold unit 17a calculates a peak hold value $V_{Pa}$ of the result of the DFT processing by the DFT processing unit 16a, whereas the peak hold unit 17b calculates a peak hold value $V_{Pb}$ of the result of the DFT processing by the DFT processing unit 16b. The averaging units 18a and 18b perform filtering processing on the peak hold values respectively output from the peak hold units 17a and 17b by the following Formula (1) to average the peak hold values. The threshold computing unit 19a obtains a threshold value $V_{THa}$ for the determination of knock by the following Formula (2) based on an output $V_{BGLa}$ from the averaging unit 18a, whereas the threshold computing unit 19b obtains a threshold value $V_{THb}$ for the determination of knock by the following Formula (2) based on an output $V_{BGLb}$ from the averaging unit 18b.

[Formula 1]

$$V_{BGLa,b}(n)=K_1 \times V_{BGLa,b}(n-1)+(1-K_1)\times V_{Pa,b}(n) \quad (1)$$

where $V_{BGL(n)}$ is a filter value, $V_{P(n)}$ is a peak hold value, and $K_1$ is an averaging factor.

[Formula 2]

$$V_{THa,b}(n)=V_{BGLa,b}(n)\times K_{tha,b}+V_{ofs\,a,b} \quad (2)$$

where $V_{TH(n)}$ is a threshold value, $K_{th}$ is a threshold factor, and $V_{ofs}$ is a threshold offset.

The microcomputer also includes comparison operation units 20a and 20b, retard amount per ignition computation units 21a and 21b, and knock retard amount computation units 22a and 22b. The comparison operation unit 20a compares the peak hold value $V_{Pa}$ from the peak hold unit 17a and the threshold value $V_{THa}$ from the threshold computation unit 19a with each other to determine the occurrence/non-occurrence of knock based on the following Formula (3) to output a signal $V_{Ka}$ according to a knock intensity. The comparison operation unit 20b compares the peak hold value $V_{Pb}$ from the peak hold unit 17b and the threshold value $V_{THb}$ from the threshold computation unit 19b with each other to determine the occurrence/non-occurrence of knock based on the following Formula (3) to output a signal $V_{Kb}$ according to a knock intensity. The retard amount per ignition computation unit 21a computes the amount of retard $\Delta\theta_{Ra}$ according to the knock intensity for one ignition by the following Formula (4) from the result of knock determination $V_{ka}$ of the comparison operation unit 20a, whereas the retard amount per ignition computation unit 21b computes the amount of retard $\Delta\theta_{Rb}$ according to the knock intensity for one ignition by the following Formula (4) from the result of knock determination $V_{kb}$ of the comparison operation unit 20b. The knock retard amount computation unit 22a integrates the amounts of retard for one ignition $\Delta\theta_{Ra}$ from the retard amount per ignition computation unit 21a to compute a knock correction amount $\theta_{Ra}$ for the ignition timing. In the same manner, the knock retard amount computation unit 22b integrates the amounts of retard for one ignition $\Delta\theta_{Rb}$ from the retard amount per ignition computation unit 21b to compute a knock correction amount $\theta_{Rb}$ for the ignition timing. Each of the knock retard amount computation units 22a and 22b returns to advance the ignition timing when the knock does not occur.

[Formula 3]

$$V_{Ka,b}(n)=V_{Pa,b}(n)-V_{THa,b}(n) \quad (3)$$

where $V_{K(n)}$ is a knock intensity (when $V_{K(n)}>0$, the occurrence of knock is determined).

[Formula 4]

$$\Delta\theta_{Ra,b}(n)=V_{Ka,b}(n)/V_{THa,b}(n)\times K_{g\,a,b} \quad (4)$$

where $\Delta\theta_{R(n)}$ is the amount of retard for one ignition, and $K_g$ is a retard amount reflecting factor.

[Formula 5]

$$\theta_{Ra,b}(n)=\theta_{Ra,b}(n-1)+\Delta\theta_{Ra,b}(n)-K_{a\,a,b} \quad (5)$$

where $\theta_{R(n)}$ is a knock correction amount, and $K_a$ is an advance return constant.

For the thus computed knock correction amounts $\theta_{Ra}$ and $\theta_{Rb}$ for different knock-specific frequencies, the ECU 13 uses a larger knock correction amount to calculate final ignition timing $\theta_{IG}$ by the following Formula (6).

[Formula 6]

$$\theta_{IG}=\theta_B-\max\{\theta_{Ra}(n),\theta_{Rb}(n)\} \quad (6)$$

where $\theta_B$ is basic ignition timing.

The method of causing the ECU 13 to realize the knock detection using the result of spectrum computation by the DFT and the knock control for retarding the ignition timing to suppress the knock has been described above.

Figure 4:
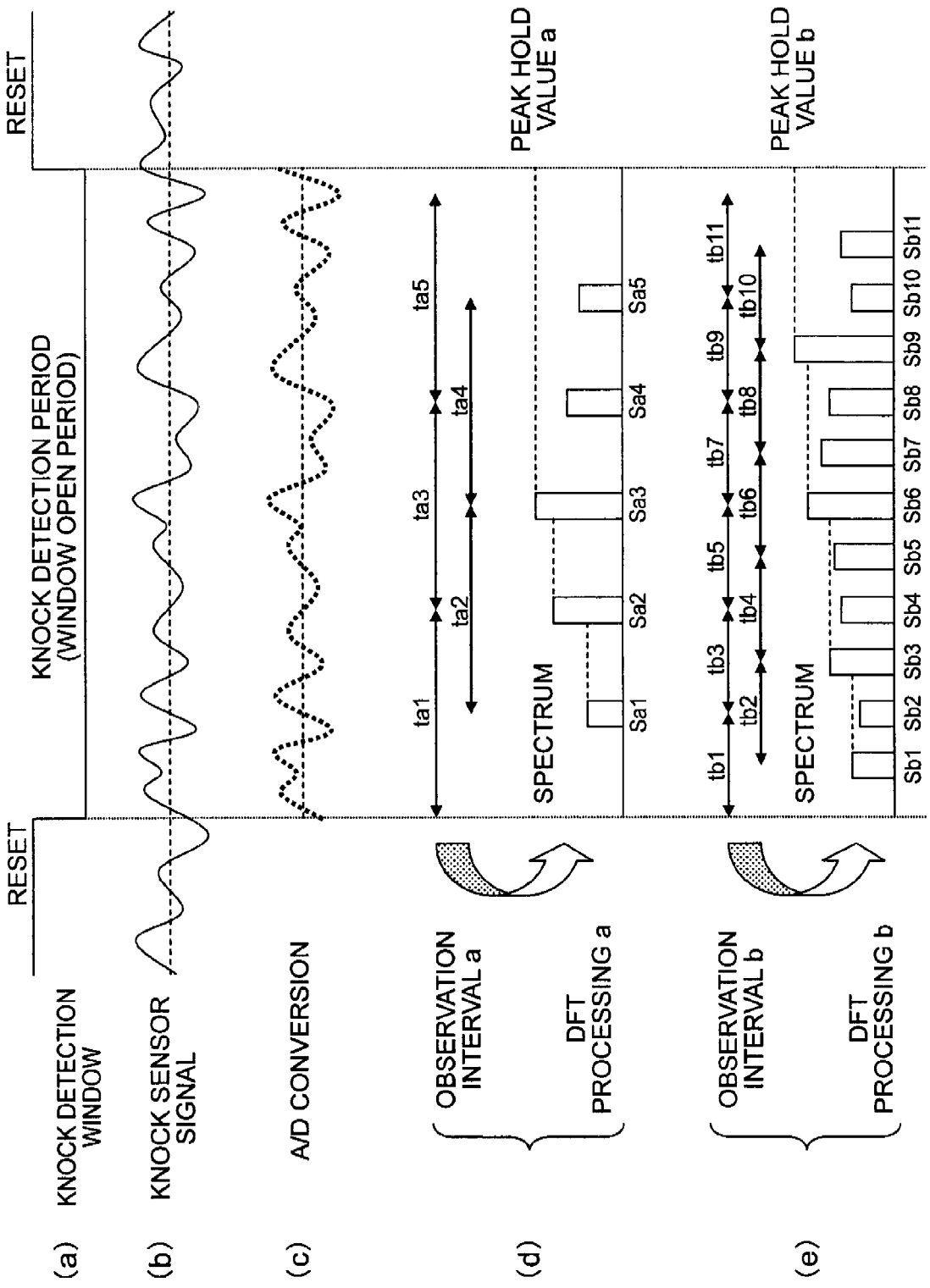
FIG. 4 is a view for illustrating a processing method in DFT processing units illustrated in FIG. 3.

Next, the details of the DFT processing method by the DFT processing units 16a and 16b are described. FIG. 4 illustrates processing from the execution of the DFT processing by the DFT processing units 16a and 16b on the result of the A/D conversion (denoted by the reference numeral 15 in FIG. 5) during the knock detection period (window open period) for each of the observation intervals to compute a spectrum to the calculation of the peak hold values by the peak hold units 17a and 17b.

As illustrated in FIG. 4, the A/D conversion unit 15 performs the A/D conversion (see (c) of FIG. 4) on the knock sensor signal (see (b) of FIG. 4), for example, every 20 μs, in the knock detection period (window open period) (see (a) of FIG. 4). Next, for the knock sensor signal loaded into the A/D conversion unit 15, the DFT processing units 16a and 16b use the function of the observation interval setting means to divide the knock sensor signal to set observation intervals a and b each containing a predetermined number of samples. Then, the DFT processing units 16a and 16b use the function of the multi-frequency simultaneous analysis means to simultaneously analyze multiple frequencies by the discrete Fourier transform for each of the observation intervals to calculate spectra for the predetermined number of samples. Then, the peak hold units 17a and 17b calculate the spectrum maximum values in the knock detection period (window open period) as a peak hold value a and a peak hold value b (see (d) and (e) of FIG. 4).

Figure 6:
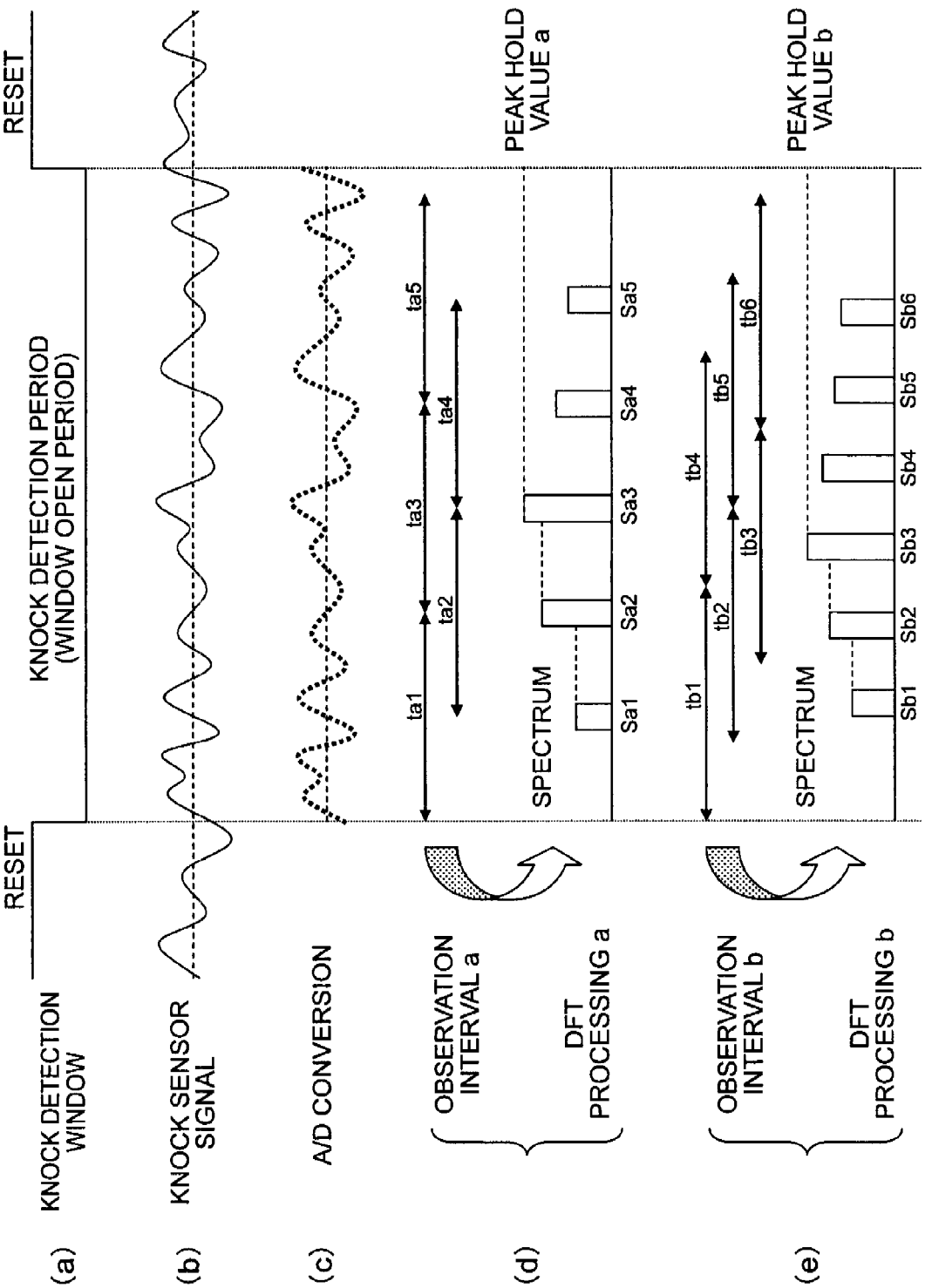
FIG. 6 is a view for illustrating a method of processing in the DFT processing units when subintervals in the observation interval are overlapped by ⅔ according to a frequency to be analyzed in contrast to the method of processing illustrated in FIG. 4 where the subintervals in the observation intervals are moved in a time direction to be overlapped by ½.

The each of the DFT processing units 16a and 16b uses the function of the observation interval setting means to move each subinterval contained in the observation interval in a time direction to make the subinterval overlap the previous subinterval by ½. This is a treatment to improve time accuracy because the accuracy in the time direction decreases when the observation interval is simply divided to provide the subintervals in a consecutive manner (for example, when only subintervals ta1, ta3 and ta5 in the observation interval a are used). In FIG. 4, the subintervals are overlapped by ½. As in the observation interval b in FIG. 6, however, the subintervals may be overlapped by, for example, ⅔ according to a frequency to be analyzed (see (e) of FIG. 6). Spectra sa1 to sa5 are respectively spectra in subintervals ta1 to ta5 in the observation interval a. Similarly, spectra sb1 to sb11 are respectively spectra in subintervals tb1 to tb11 in the observation interval b.

A method of selecting the number of samples N in the observation intervals a and b in the DFT processing units 16a and 16b is described. FIG. 5 shows the relation between the number of samples N contained in the observation interval, the number of waves k of a basis function of the Fourier transform, which is reproduced by the number of samples N, and a frequency to be analyzed fk [kHz].

In FIG. 5, the frequency to be analyzed fk [kHz] only up to 25 kHz is shown because aliasing occurs in an area equal to or higher than 25 kHz when the sampling is performed at 50 kHz. The number of samples N is 16 to 36 (on a 4-to-4 basis) as an example. However, the number of samples N is not required to be limited thereto.

The case where the number of samples N is set to 32 is taken as a reference. The reason why N=32 is taken as the reference is as follows. The FFT is generally used for the frequency analysis using the digital signal processing. As constraint conditions of the FFT, the number of samples N is required to be a power of two and is also required to be constant over all the frequency bands. In order to show a problem in the FFT, N=32 is used as the reference. Since the DFT is used in place of the FFT in the present invention, the above-mentioned constraints do not exist. However, when all the frequency bands are to be analyzed, the amount of computation becomes disadvantageously enormous as compared with the amount of computation of the FFT. Therefore, in this embodiment, the DFT is carried out only for two frequency bands. As a result, a necessary number of frequency bands can be simultaneously analyzed with a required minimum amount of computation. Further, the degree of freedom in selection of the number of samples N is improved. The number of frequency bands is not limited to two. Multiple frequency bands can also be simultaneously analyzed.

Referring to a column of N=32 in FIG. 5, the frequency to be analyzed fk=0 to 25 kHz is divided into seventeen steps. Each step size is 1.56 kHz. Generally, it is considered that a knock-specific frequency is frequently included in the range of 5 to 15 kHz. Therefore, in this case, it is considered that a frequency band of about 6.25 kHz (k=4) to 14.06 kHz (k=9) can be used for the detection of knock.

Now, two problems are conceivable. The first problem is that a desired frequency band cannot be sometimes selected because the frequency step size is 1.56 kHz. For example, when 7 kHz is desired to be selected as a knock-specific frequency, the options are limited to 6.25 kHz (k=4) and 7.81 kHz (k=5). The second problem is a relatively low temporal resolution on the high frequency side. When 6.25 kHz (k=4) and 12.5 kHz (k=8) are compared with each other, the number of waves contained in the same observation interval is doubled, which shows a difference in temporal resolution with respect to the frequency resolution.

In order to solve the above-mentioned problems, a key of the present invention is that the number of samples N contained in the observation interval, the number of waves k of the basis function of the Fourier transform, which is reproduced by the number of samples N, and the frequency to be analyzed fk [kHz] are selected based on the table in FIG. 5. For example, when 7 kHz is desired to be selected as the knock-specific frequency, a point satisfying N=28 and k=4 is selected to select 7.14 kHz as the frequency to be analyzed, or a point satisfying N=36 ad k=5 is selected to select 6.94 kHz. As a result, a frequency band closer to the knock-specific frequency can be analyzed as compared with the case where the number of samples N is fixed to 32.

Next, when 12.5 kHz is selected as the knock-specific frequency, a point satisfying N=16 and k=4 or N=20 and k=5 is selected instead of selecting a point satisfying N=32 and k=8. As a result, it can be said that the balance between the temporal resolution and the frequency resolution can be improved. Specifically, a change in vibration intensity becomes faster as the frequency becomes higher. Therefore, the analysis period is set shorter on the high frequency side as compared with the analysis period on the low frequency side to capture a rapid change at the high frequency. As described above, the number of waves contained in the observation interval is fixed to a predetermined number (for example, about 4 to 6 in an area in a thick frame in FIG. 5). As a result, necessary and sufficient temporal resolution and frequency resolutions for the analysis of the frequency of knock can be ensured. The degree of freedom in selection of the frequency to be analyzed is increased as compared with the FFT with the number of samples being fixed to 32.

The approach of fixing the number of waves to a constant number as described above is generally called wavelet transform. However, the wavelet transform has a problem that the range of choices of the frequency to be analyzed is reduced because the number of waves k is fixed and the frequency to be analyzed fk is selected according to the number of samples N. Therefore, in the present invention, the number of samples N and the number of waves k can be freely selected as described above.

Next, a method of causing the DFT processing units 16a and 16b to perform the DFT processing for each of the observation intervals obtained by the division using the above-mentioned method is described. It is known that the discrete Fourier transform is generally performed by the following Formula (7).

[Formula 7]

$$X(k) = \sum_{n=0}^{N-1} x(n) \cdot e^{-j\frac{2\pi}{N}kn} \quad (7)$$

$$= \sum_{n=0}^{N-1} x(n) \cdot \cos\left(\frac{2\pi}{N}kn\right) - j\sum_{n=0}^{N-1} x(n) \cdot \sin\left(\frac{2\pi}{N}kn\right)$$

where x(n) is an input signal, N is the number of samples in the observation interval, n is a sample value number in the observation interval, and k is the number of waves of the basis function in the observation interval. The division of the input signal into the observation intervals is equivalent to the application of a so-called rectangular window. Therefore, when w(n) is used as a window function, Formula (7) can be written as the following Formulae (8) and (9).

[Formula 8]

$$X(k) = \sum_{n=0}^{N-1} x(n) \cdot w(n) \cdot \cos\left(\frac{2\pi}{N}kn\right) - j\sum_{n=0}^{N-1} x(n) \cdot w(n) \cdot \sin\left(\frac{2\pi}{N}kn\right) \quad (8)$$

$$w(n) = 1 \ (n = 0, 1, 2, \ldots, N-1) \quad (9)$$

FIG. 7 is a conceptual diagram of the Fourier transform with a window function (rectangular window), which shows an image of the processing expressed by the above Formulae. In FIG. 7, (a) shows the window function, (b) shows the input signal, (c) shows the input signal (A/D value)×the window function, and (d) shows the basis function.

Since discontinuous points are generated in the case of the rectangular window at the time of execution of the Fourier transform, a window function which does not generate the discontinuous point (for example, a Hanning window) is generally used. FIG. 8 shows an image when the Hanning window is used. In FIG. 8, (a) shows the window function (Hanning window), (b) shows the input signal, (c) shows the input signal (A/D value)×the window function, and (d) shows the basis function. As described above, in the discrete Fourier transform, after the result of the application of the Hanning window to the input signal is multiplied by the basis function, the integration is performed. An absolute value of the result of integration is called a spectrum. The Hanning window is expressed by the following Formula (10).

[Formula 9]

$$w(n) = \frac{1}{2} - \frac{1}{2}\cos\left(\frac{2\pi n}{N-1}\right) \ (n = 0, 1, 2, \ldots, N-1) \quad (10)$$

According to the above-mentioned method, after the result of the application of the Hanning window to the input signal is multiplied by the basis function, the integration is performed. Therefore, the amount of computation is inevitably increased. Therefore, constants obtained by multiplying the basis function by the Hanning window as the window function are stored as a table in a storage section (not shown) in each of the DFT processing units 16a and 16b. For simultaneously analyzing the plurality of frequencies by the discrete Fourier transform using the multi-frequency simultaneous analysis means, the input signal is multiplied by the prestored constant, and then, the integration is performed. As a result, the amount of computation can be reduced. FIG. 9 shows an image of the processing, whereas FIG. 10 shows an example of the tables (when the number of samples is 16). In FIG. 9, (a) shows the window function (Hanning window), (b) shows the input signal, (c) shows the input signal (A/D value), (d) shows the basis function×the window function, and (e) shows the basis function. Tables shown in FIGS. 10A and 10B correspond to DFT computation constants Kwc(n) and Kws(n) in the first term and the second term of the left-hand side of the Formula (8). In this manner, the DFT processing can be carried out with a reduced amount of computation.

As described above, according to the embodiment of the present invention, the DFT processing units 16a and 16b serving as the digital signal processing means perform the functions of the observation interval setting means for dividing the A/D converted data to set observation intervals each containing a predetermined number of samples, and the multi-frequency simultaneous analysis means for simultaneously analyzing the multiple frequencies by the discrete Fourier transform for each of the set observation intervals. Moreover, the number of samples contained in the observation interval is changed according to the frequency to be analyzed. Therefore, the present invention has excellent effects of obtaining the knock detection means capable of ensuring necessary and sufficient temporal and frequency resolutions for the analysis of the frequency of knock with the reduced amounts of computation and memory and of even increasing the number of choices of the frequency to be analyzed.

What is claimed is:

1. A control apparatus for an internal combustion engine, comprising:
   knock detection means for determining occurrence of knock based on an output signal from at least one of a knock sensor and a cylinder internal pressure sensor provided for the internal combustion engine; and
   knock control means for performing knock control to avoid the knock in detection of the knock by the knock detection means;
   wherein the knock detection means includes:
      a lowpass filter for eliminating a high frequency component of the output signal from the at least one of the knock sensor and the cylinder internal pressure sensor;
      A/D conversion means for performing A/D conversion on the output signal from the lowpass filter for each predetermined time; and
      digital signal processing means for performing digital signal processing on the data obtained by the A/D conversion performed by the A/D conversion means to perform a time-frequency analysis, the knock detection means performing knock detection based on a result of the digital signal processing by the digital signal processing means,
   wherein the digital signal processing means includes:
      observation interval setting means for dividing the data obtained by the A/D conversion performed by the A/D conversion means to set observation intervals each containing a predetermined number of samples; and
      multi-frequency simultaneous analysis means for simultaneously analyzing multiple frequencies by a discrete Fourier transform for each of the observation intervals set by the observation interval setting means, and wherein the observation interval setting means changes the number of samples contained in each of the observation intervals according to a frequency to be analyzed.

2. The control apparatus for an internal combustion engine according to claim 1, wherein the observation interval setting means moves a subinterval included in each of the observation intervals to make the subinterval partially overlap a previous subinterval.

3. The control apparatus for an internal combustion engine according to claim 1, wherein the observation interval setting means sets the number of samples large on a low frequency side and small on a high frequency side according to the frequency to be analyzed.

4. The control apparatus for an internal combustion engine according to claim 1, wherein the multi-frequency simultaneous analysis means prestores a constant used for a computation in a table when the multiple frequencies are simultaneously analyzed by the discrete Fourier transform.

5. The control apparatus for an internal combustion engine according to claim 4, wherein the constant calculated from a basis function and a window function is set in the table.

* * * * *